United States Patent
Nordman et al.

(10) Patent No.: US 12,111,247 B2
(45) Date of Patent: Oct. 8, 2024

(54) FLOW CELL FOR FIBER OPTIC SPECTROMETERS AND PHOTOMETERS

(71) Applicant: CUSTOM SENSORS & TECHNOLOGY, Fenton, MO (US)

(72) Inventors: Richard Nordman, St. Charles, MO (US); Mike Ponstingl, Sunset Hills, MO (US)

(73) Assignee: CUSTOM SENSORS & TECHNOLOGY, Fenton, MO (US)

( * ) Notice: Subject to any disclaimer, the term of this patent is extended or adjusted under 35 U.S.C. 154(b) by 385 days.

(21) Appl. No.: 17/386,229

(22) Filed: Jul. 27, 2021

(65) Prior Publication Data

US 2022/0107261 A1    Apr. 7, 2022

Related U.S. Application Data

(60) Provisional application No. 63/057,106, filed on Jul. 27, 2020.

(51) Int. Cl.
*G01N 21/01* (2006.01)
(52) U.S. Cl.
CPC .................... *G01N 21/01* (2013.01)
(58) Field of Classification Search
CPC ............. G01N 2021/036; G01N 21/01; G01N 21/0303; G01N 21/05; G01N 21/278; G01N 21/03; G01N 21/0307
USPC ........................................................ 356/246
See application file for complete search history.

(56) References Cited

U.S. PATENT DOCUMENTS

| 3,705,773 A * | 12/1972 | Vicario | G01N 35/1095 356/409 |
|---|---|---|---|
| 4,571,078 A | 2/1986 | Capps, II | |
| 9,285,250 B2 | 3/2016 | Furey et al. | |
| 2005/0117152 A1 | 6/2005 | Barnikol et al. | |
| 2008/0079942 A1 | 4/2008 | Buettner et al. | |
| 2012/0119101 A1 | 5/2012 | Wynn | |
| 2017/0307525 A1 | 10/2017 | Langhoff et al. | |
| 2019/0317009 A1 | 10/2019 | Ehring et al. | |
| 2019/0388601 A1 * | 12/2019 | Rose | G01J 3/0291 |
| 2020/0225145 A1 | 7/2020 | Quidant et al. | |
| 2020/0256717 A1 * | 8/2020 | Qiu | G01F 22/02 |

FOREIGN PATENT DOCUMENTS

| CN | 110567875 A | 12/2019 |
| JP | 2016099311 A | 5/2016 |
| WO | 2008049484 A1 | 5/2008 |

OTHER PUBLICATIONS

International Search Report and Written Opinion in Application No. PCT/US2021/043294, mailed Nov. 18, 2021, 10 pages.
European Patent Office, Extended Search Report for European Application No. 21824269.1, Issued Dec. 12. 2022, 10 Pages.

* cited by examiner

*Primary Examiner* — Sunghee Y Gray
(74) *Attorney, Agent, or Firm* — Armstrong Teasdale LLP (57) ABSTRACT

A flow cell and flow cell system which allows for calibration of an attached sensor to be performed in place. Specifically, the ability to utilize standard addition techniques of calibration without the need to take a test sample from the process stream or remove the sensor from operating on the flow cell.

12 Claims, 8 Drawing Sheets

FLOW CELL FOR FIBER OPTIC SPECTROMETERS AND PHOTOMETERS

CROSS REFERENCE TO RELATED APPLICATION(S)

This application claims the benefit of U.S. Provisional Patent Application Ser. No. 63/057,106, filed Jul. 27, 2020, the entire disclosure of which is herein incorporated by reference.

BACKGROUND OF THE INVENTION

Field of the Invention

The invention relates to flow cells and related components for spectroscopic or photometric testing. The flow cells may incorporate cuvette holders to allow for in-place calibration of the testing apparatus and the performance of standard addition calibration.

Description of the Related Art

There are a number of places where material production or activity creates what is effectively a process stream. Continuous manufacturing techniques as well as processes which are continuously acting on elements create a near constant output of end product. An example of this is water purification where an essentially continuous stream of impure water is taken in and an essentially continuous output of cleaner water is generated. This can be, for example, where water needs to be treated prior to its use in a process to provide process efficiency or in the treatment of wastewater streams. Another area is in bioprocess fluid streams used in the manufacture of biological materials. In fact, many activities in chemical, petro-chemical, pharmaceutical, waste processing, food, and beverage manufacturing process, among many others, involve the monitoring of process streams.

In these continuous processes, it should be recognized that monitoring of the process is important. In upstream monitoring, it is typically important to determine an input composition of the stream to effect correct treatment. For example, in waste treatment not all wastewater streams fed into a cleaning process or system have identical properties and depending on the nature of the waste stream input, the treatment process may need to be slightly altered to accurately clean the stream. As a still further example, source water for a manufacturing process may include naturally occurring contaminants in different amounts based on time and source and these streams need to be treated with chemicals to remove the impurities present to safe levels before the water is used to avoid buildup or damage to downstream devices.

The process stream downstream of a cleaning process also often requires monitoring. In this case, the monitoring is typically to determine if an upstream process acted as expected. For example, in bioprocess fluid streams, monitoring of the downstream fluid is often performed to provide indications of when an upstream filter is beginning to fail and undesirable materials are not being cleanly filtered out. Failure to accurately measure the composition of the stream in these cases can result in a failure to detect a failing component or other process upstream resulting in a potentially dangerous stream being accepted. Similarly, a waste stream may be monitored after treatment to insure that the stream is within acceptable parameters before being discharged. As this last example shows, it is therefore also possible to monitor both upstream and downstream of the same process stream.

In both upstream and downstream applications, the addition of too much or too little treatment chemicals, or the use of inaccurate processes for the stream composition, can produce process inefficiency and a potentially undesirable or dangerous resultant product stream. Inefficiencies can include issues such as, but not limited to, the economic waste of valuable treatment chemicals, not removing a desired amount of the target before discharge or use resulting in potential downstream problems, or requiring excess time of the process stream in treatment slowing the manufacturing process which is dependent on the stream. In many cases involving chemical additive treatment, adding too much additive can also create a new problem downstream as the excess additive may itself result in buildup or damage to downstream processes, excess treatment further downstream to remove the additive, or a need for a further treatment process downstream that could otherwise be eliminated.

In all these cases, the ability to continuously and accurately monitor the composition of the process stream in order to accurately determine what it contains can be valuable. In downstream monitoring, should the end product not meet expectations, the processes upstream may be altered, potentially on the fly (for example, temperatures can be lowered, residence times in various phases can be increased, amounts of chemicals added can be increased or decreased, or filters may be swapped out) to provide for slightly different manufacturing parameters to make sure that the desired output is obtained. Similarly, in upstream detection, detected changes to inputs can result in changes, again potentially on the fly, being made to processes downstream to improve output. Alternatively, changes in composition may indicate wear or failure of upstream components which will need to be replaced with the process halted. However, these can be more accurately predicted and planned for.

Due to the underlying process stream being an essentially continuous flow, the monitoring of the process stream is also preferably continuous and so long as the monitoring operation does not require the addition of any materials to the process stream, it often can be. One fairly common form of continuous monitoring is the use of light in spectrometry or photometry applications. While both can be performed in a batch setting, so long as an input light source can shine through the process stream, or a segregated portion of the process stream, they can be performed generally continuously on the stream so long as output processing from the sensor has sufficient speed. As modern computers typically can obtain sensor results in real-time or near real-time, this form of continuous monitoring can provide for very quick feedback. Thus, a concern can be quickly detected with the composition of the target stream. Basically, the monitoring knows acceptable parameters and when the stream gets outside the parameters, alerts can be triggered or changes can be made automatically by the computer or other processor to the associated processes.

Optical monitoring is typically performed through the use of a flow cell. A flow cell is effectively a hollow device having a relatively small volume that the process stream, or a portion of the process stream, will pass through. This volume is positioned inside an enclosure (which effectively forms the flow cell) and the flow cell has connectors to couple the sensor to liquid or gas handling components to provide the continuous samples of the process stream and light handling connectors to allow light to pass through the sample in the flow cell. The output light is then monitored by the processor to determine the relevant composition of the process stream. An example of a flow cell is provided in U.S. Pat. No. 9,285,250, the entire disclosure of which is herein incorporated by reference.

Photometry and spectrometry are particularly useful testing methods when it comes to flow cells. As both systems typically utilize light absorption by the sample, it is relatively easy to place the sample in the cell at an instant where it can be penetrated by light of the wavelengths of interest allowing incoming light to be projected into the cell, through the sample, and outgoing light to be collected. This allows for the sample to be completely separated from the testing equipment so that the testing equipment can be disconnected, modified or replaced without the need to ever disturb the material in the flow cell, or the process stream. Further, the sample is not held in the flow cell, but is simply interrogated as it passes through the cell. Typically, these types of flow cells are designed to interconnect with fiber optic cables to provide for excellent light supply and capture capability, but that is not required.

While flow cells are excellent for performing process measurements, one concern associated with their use is the accuracy and calibration of the spectrometer or photometer they are connected to. These types of devices often require calibration to the specifics of the process stream being monitored and may require recalibration over time to insure that they remain accurate. Traditional calibration and recalibration of these systems has typically been performed by disconnecting the spectrometer or photometer hardware from the flow cell and then reconnecting it to a specially designed test rig where it can be used to interrogate specific samples. The test rig would have placed therein specific calibration samples which can be used to calibrate the readings of the sensor based on their absolute value. Once calibrated, the sensor is then separated from the test rig and returned to its monitoring position on the flow cell where it tests normally.

While this can be valuable for calibration, the use of a separate test rig can present some issues in ongoing calibration and monitoring of process streams. In the first instance, in many process streams the use of specific samples for calibration is not effective. For example, if the process stream includes many components but most are not of interest, a calibration sample which includes only the target material may not accurately calibrate the sensor. In this case, the other materials may serve to skew the sensor's readings (high or low) because they also interact with the light from the source, but the sensor is not taking their interaction into account. This can be particularly problematic if the concentration of these non-target but interfering materials could change over time.

To deal with concerns that the process stream may include materials that can be detected by the sensor, but are not of relevance, the sensor is often calibrated using a process called "standard addition". In standard addition, instead of using just one or a small number of pre-calibrated samples, a number of calibration samples are created from a single test sample taken from the process stream. The test sample is from the actual process stream and is used as the base for all the calibration samples. Each portion of the sample has a known but different amount of the target material of interest added to it. Thus, all the calibration samples are expected to comprise everything the original test sample included but with known, and often specifically stepped, amounts of the target material added. This sample series can then be used for calibration. Calibration is obtained since the sensor will generally generate a linear relationship for the samples as the amount of material addition increases (as the only changes to the sample are increases in the target material). The line formed will not hit the origin as the original test sample also includes some of the target material, but instead the line can be extrapolated to contact the sample axis which will indicate the amount of the target material in the original test sample and that amount can be used for calibration.

Standard addition is a valuable tool for calibration in many process streams utilizing photometric and spectroscopic analysis because it can be so difficult to avoid the effects of other materials in the process stream interacting with the light being used as a source. However, the use of standard addition makes the calibration process substantially more difficult. In the first instance, it is necessary to collect a relative large test sample generally at or near the location of the flow cell to insure that prior or subsequent processes do not alter the composition (and, thus, render the calibration potentially inaccurate).

This can be difficult in a continuous process stream and particularly in one which presents concerns for easy access to the stream. Access to the stream can be a problem for biological streams which may have heightened contamination risk either for the product in the stream or the stream itself being of risk to others, or for streams under non-atmospheric conditions. For example, streams which are at particularly high temperature or pressure can be very difficult to obtain test samples of as the act of obtaining the sample may comprise unacceptable risk, require shutting down of the process related to the process stream, and/or can result in sample alteration, e.g. because it cools and a particular material precipitates out for example or because the sample behaves differently within the process stream than under testing conditions.

SUMMARY OF THE INVENTION

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Because of these and other problems in the art, it would be desirable to have a flow cell and flow cell system which allows for calibration of an attached sensor to be performed in place. Specifically, the ability to utilize standard addition techniques of calibration without the need to take a test sample from the process stream or remove the sensor from operating on the flow cell.

There is described herein, among other things, a flow cell comprising: a first stream coupler, said first stream coupler comprising a first main body having a first hollow internal volume therein and a first connector having a first orifice therein, wherein fluid flows from said first orifice into said first hollow internal volume and vice-versa; a second stream coupler, said second stream coupler comprising a second main body having a second hollow internal volume therein and a second connector having a second orifice therein, wherein fluid flows from said second orifice into said second hollow internal volume and vice-versa; a first seal positioned on an end of said first hollow internal volume and including a first light window capable of transmitting light into and out of said first hollow internal volume; a second seal positioned on an end of said second hollow internal volume and including a second light window capable of transmitting light into and out of said second hollow internal volume; an input, for directing light into said first hollow internal volume; and a detector, for detecting light exiting from said second hollow internal volume, said input and said detector together forming a sensor; wherein, said first stream coupler is arranged adjacent said second stream coupler so fluid flows from said first orifice, to said first hollow internal volume, to said second hollow internal volume, to said second orifice; and wherein light passes from said input, through said first light window, through said first hollow internal volume, through said second hollow internal volume, and through said second light window before being detected by said detector.

In an embodiment, the flow cell further comprises a hollow spacer positioned between said first hollow internal volume and said second hollow internal volume through which both said light and said fluid flows.

In an embodiment, the flow cell further comprises a hole in said detector into which a holder may be placed.

In an embodiment of the flow cell, the holder comprises a material standard.

In an embodiment of the flow cell, the standard is a solid material.

In an embodiment of the flow cell, the solid material comprises glass.

In an embodiment of the flow cell, the holder comprises a cuvette.

In an embodiment of the flow cell, the cuvette is filled with a liquid and said liquid comprises a material standard.

In an embodiment of the flow cell, the cuvette is sealed.

There is also described herein, in an embodiment, a flow cell comprising: a first component fuel cell comprising: a main body including an input portion; a detector portion which, in combination with said input portion, forms a sensor; and a cradle between said input portion and said detector portion, said cradle have a flow cell positioned thereon; a housing cover positioned over said flow cell to maintain said flow cell in said cradle; a hole positioned in said detector portion.

In an embodiment, the flow cell further comprises a holder, wherein said holder is placed in said hole when said flow cell is removed from said cradle.

In an embodiment of the flow cell, the holder comprises a material standard.

In an embodiment of the flow cell, the standard is a solid material.

In an embodiment of the flow cell, the solid material comprises glass.

In an embodiment of the flow cell, the holder comprises a cuvette.

In an embodiment of the flow cell, the cuvette is filled with a liquid and said liquid comprises a material standard.

In an embodiment of the flow cell, the cuvette is sealed.

There is also described herein, in an embodiment, a multi-pathlength flow cell comprising: a first stream coupler, said first stream coupler comprising a first main body having a first hollow internal volume therein and a first connector having a first orifice therein, wherein fluid flows from said first orifice into said first hollow internal volume and vice-versa; a second stream coupler, said second stream coupler comprising a second main body having a second hollow internal volume therein and a second connector having a second orifice therein, wherein fluid flows from said second orifice into said second hollow internal volume and vice-versa; a linking coupler including a third hollow internal volume, a fourth hollow internal volume, and a tunnel fluidly connecting said third internal volume to said fourth internal volume; a hollow spacer; a first input, for directing light into said first hollow internal volume; a first detector, for detecting light exiting from said third hollow internal volume, said first input and said first detector together forming a first sensor; a second input, for directing light into said second hollow internal volume; and a second detector, for detecting light exiting from said fourth hollow internal volume, said second input and said second detector together forming a second sensor; wherein, said first stream coupler is arranged adjacent said linking coupler so fluid flows from said first orifice, to said first hollow internal volume, to said third hollow internal volume, and into said tunnel; wherein, said second stream coupler is arranged adjacent said linking coupler so fluid flows from said tunnel, to said fourth hollow internal volume, to said second hollow internal volume, and out said second orifice; wherein light passes from said first input, through said first hollow internal volume and through said third hollow internal volume before being detected by said first detector; and wherein light passes from said second input, through said second hollow internal volume and through said fourth hollow internal volume before being detected by said second detector.

In an embodiment, the multi-pathlength flow cell further comprises a hole in said detector into which a holder may be placed.

In an embodiment of the multi-pathlength flow cell, the holder comprises a material standard.

DETAILED DESCRIPTION OF THE PREFERRED EMBODIMENT(S)

The following detailed description and disclosure illustrates by way of example and not by way of limitation. This description will clearly enable one skilled in the art to make and use the disclosed systems and methods, and describes several embodiments, adaptations, variations, alternatives and uses of the disclosed systems and methods. As various changes could be made in the above constructions without departing from the scope of the disclosures, it is intended that all matter contained in the description or shown in the accompanying drawings shall be interpreted as illustrative and not in a limiting sense.

Figure 7:
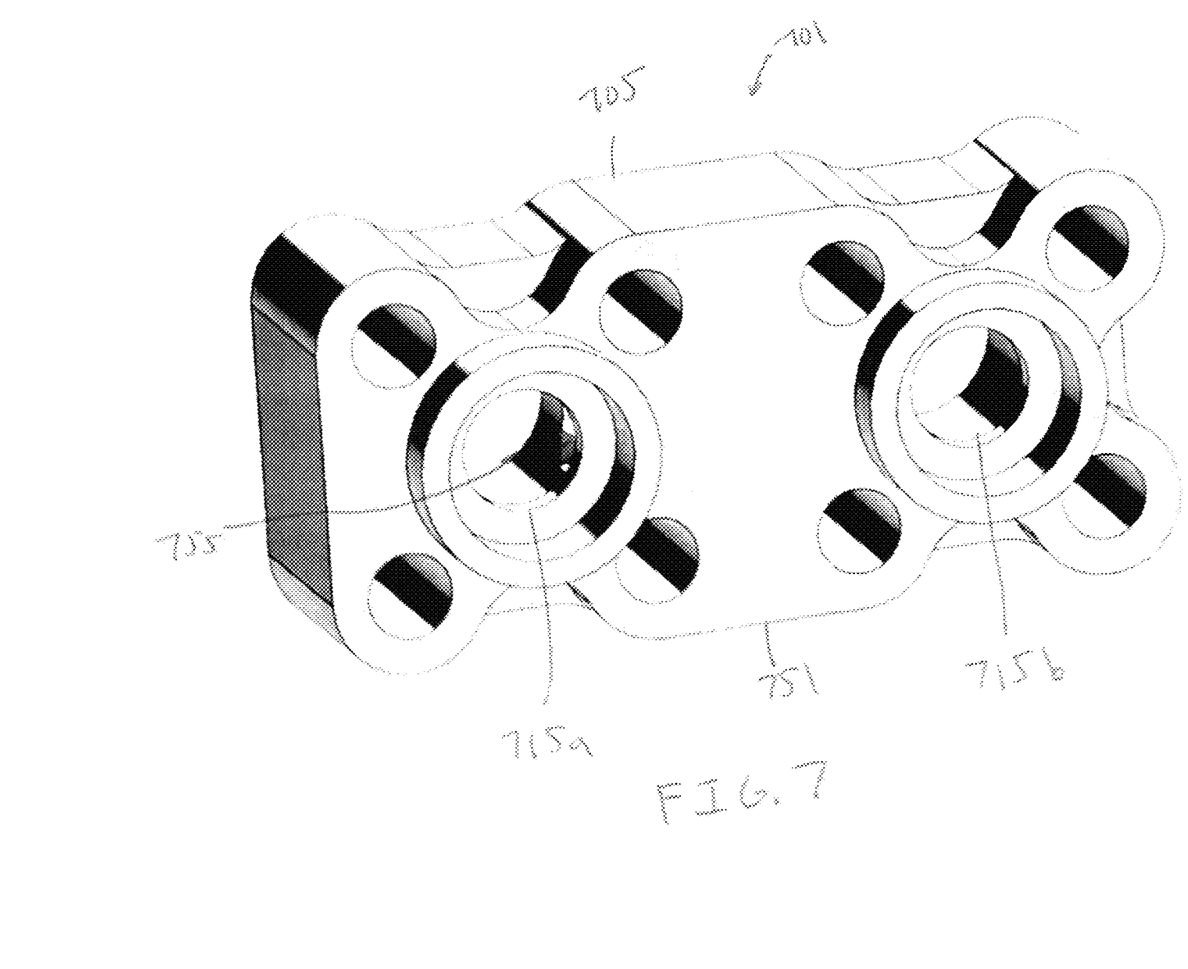
FIG. 7 shows an embodiment of a flow path linking coupler which allows for two flow cells of different testing path length to be coupled as a single unit.
Figure 8:
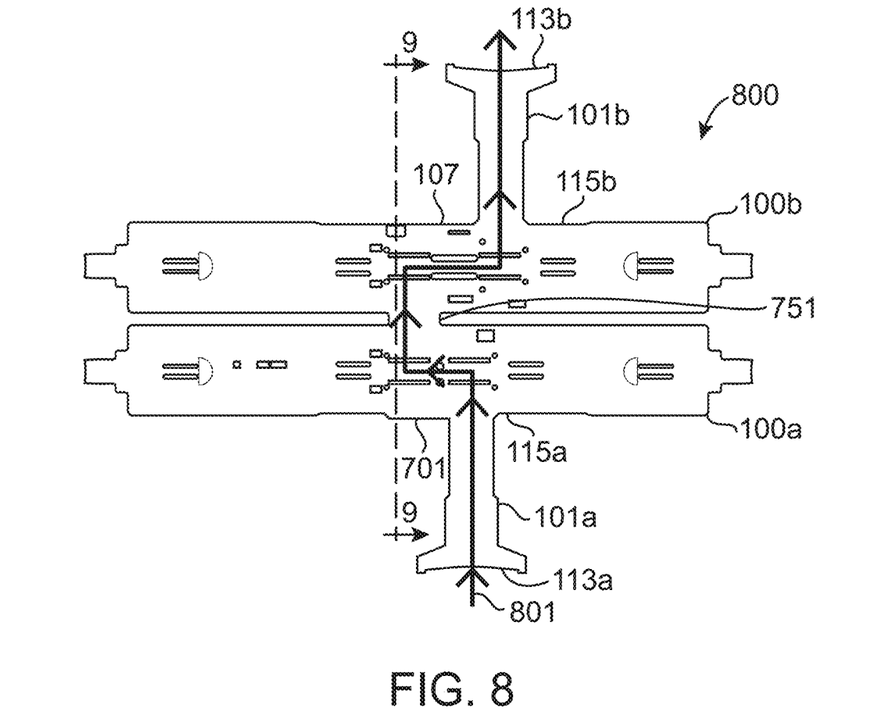
FIG. 8 shows a top view of two flow cells coupled together into a multi-pathlength flow cell using the linking coupler of FIG. 7 and illustrating the flow of material through the cells and the two different testing path lengths.
Figure 9:
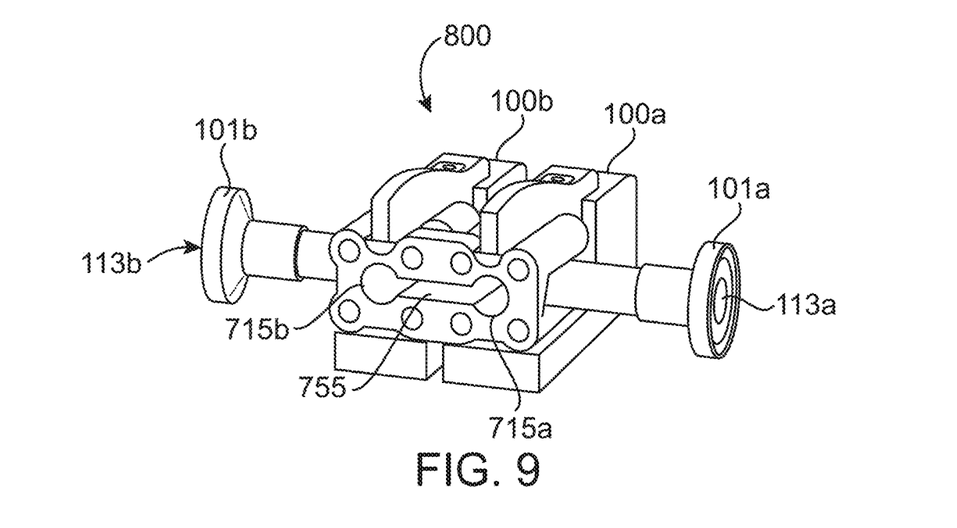
FIG. 9 shows a cut-through of the multi-pathlength flow cell of FIG. 8 helping to illustrate the tunnel within the linking coupler of FIG. 7.

FIGS. 1-6 provide for various embodiments of a flow cell, specifically a fiber optic based flow cell, which is designed to allow for calibration to be performed in place. The flow cells can also be coupled together, as illustrated in FIGS. 7-9 to provide for a flow cell unit which allows testing using two different path lengths. The embodiments also allow for easy disconnection of sensor interconnections should separate testing or calibration be desired or should the sensor system need to be replaced. The embodiment of FIGS. 1-5 is primarily designed for use in applications where the flow cell will be a fairly permanent addition to the process stream or to a diversion path or similar structure serving to siphon a portion of the process stream for testing. The embodiment of FIG. 6, instead, is designed for use with a flow cell which is readily removed from the process stream and replaced. The embodiment of FIG. 6 will therefore be common in biological process streams where it may require a single use or ready replacement while the embodiment of FIGS. 1-5 will be more commonly used where the flow cell is intended to remain in place for a substantial time and may be difficult to replace.

The embodiment of FIGS. 1-5 is particularly well suited for difficult to handle process streams such as, but not limited to, those maintained at elevated temperature or pressure. The embodiment of FIGS. 1-5 can also be used where the flow cell will be subjected to difficult process conditions such as a process stream which needs to be tested at high temperature or pressure or includes materials which are particularly dangerous, toxic, or otherwise need to be safely contained away from human exposure.

Figure 1:
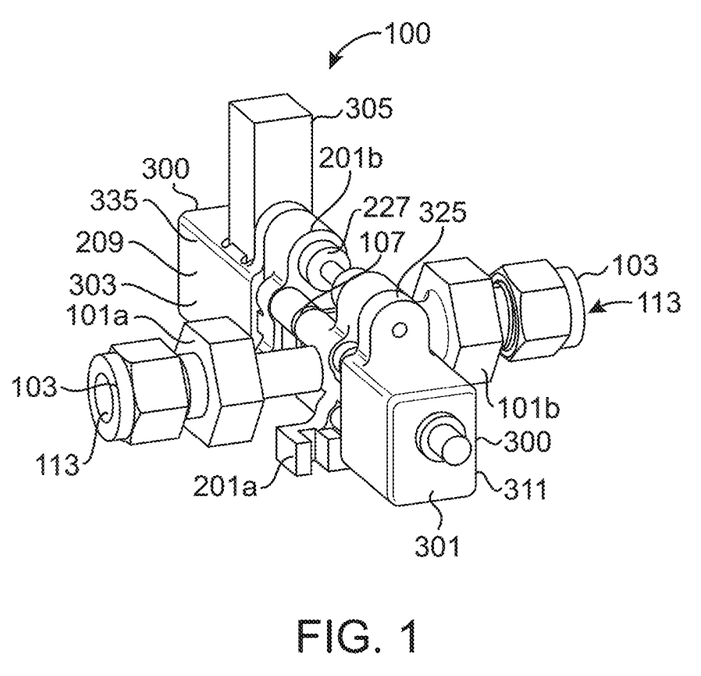
FIG. 1 shows an embodiment of an assembled flow cell with a standard in place.
Figure 2:
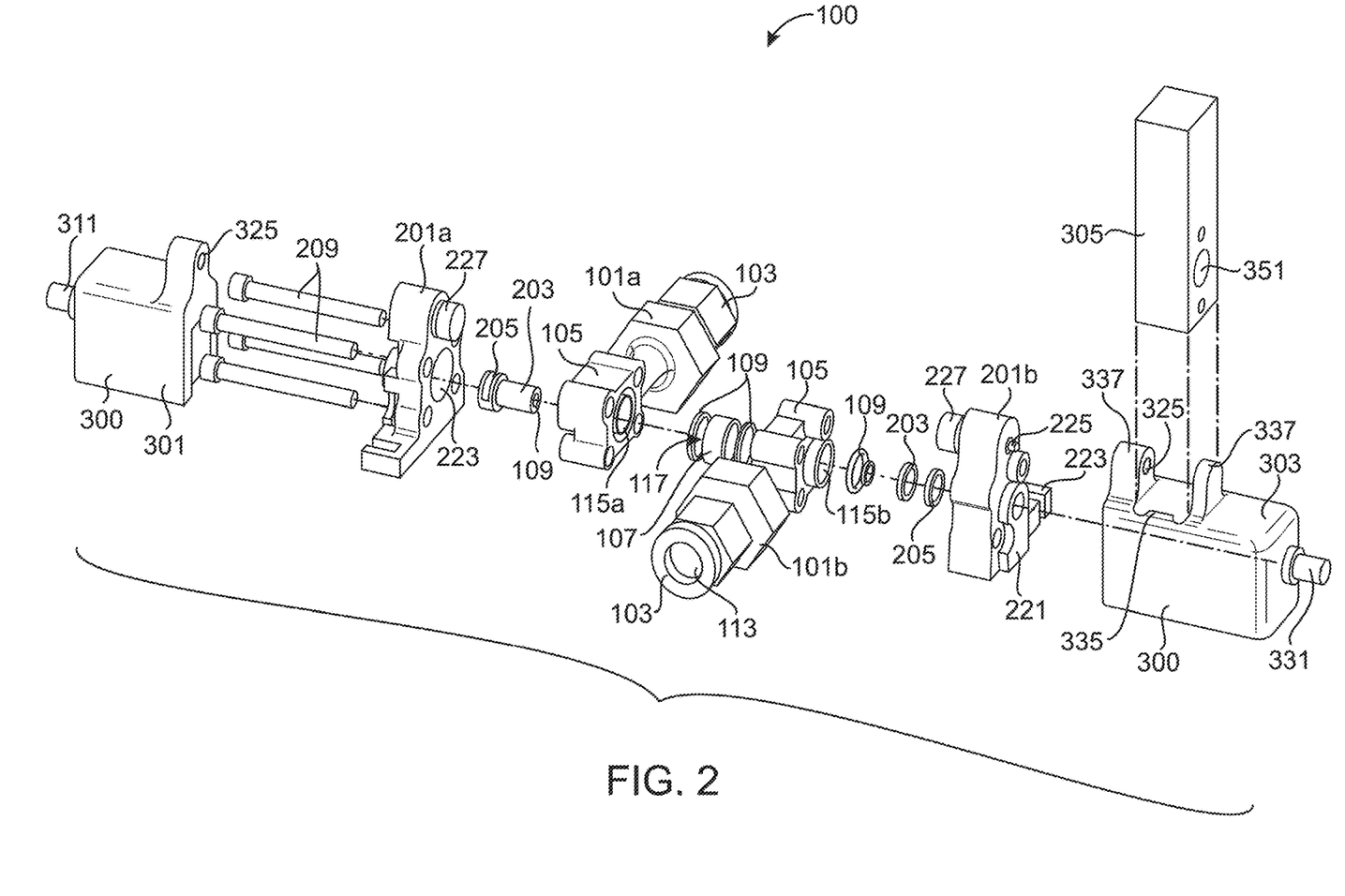
FIG. 2 shows the embodiment of FIG. 1 in an exploded view.

FIGS. 1 and 2 provide for a first embodiment of a flow cell (100) designed to provide for in situ calibration, such as through the process of standard addition. FIG. 1 shows the flow cell (100) assembled while FIG. 2 shows the same cell (100) in exploded form. In FIG. 1 the core of the cell comprises two generally identical stream couplers (101a) and (101b). Each of these comprises a connector (103) which is designed to interface with the process stream and provide the process stream, via an orifice (113) to the internal volume (115a) or (115b) of the stream coupler (101a) and (101b) and vice-versa. In the depicted embodiment, the connectors (103) comprise standard compression fittings. The connectors (103) are then connected to a main body (105) of each stream coupler (101). The main body (105) in the depicted embodiment comprises a exterior wall with a hollow internal volume (115a) or (115b). Fluid will typically arrive from the process stream which is connected to the connector (103), pass into the orifice (113) of the first coupler (101a) or (101b) and flow from the orifice (113) into the hollow internal volume (115a) of (115b).

As should be apparent in FIGS. 1 and 2, two essentially identical couplers (101a) and (101b) are connected together via a hollow spacer (107) which has an internal volume (117) that interconnects the volume (115a) of the first coupler (101a) with the volume (115b) of the second coupler (101b) to form a combined volume (175). The connection may be made via O-rings (109) as shown or via any other method known of ordinary skill. This is shown in additional details in FIG. 5.

Figure 3A:
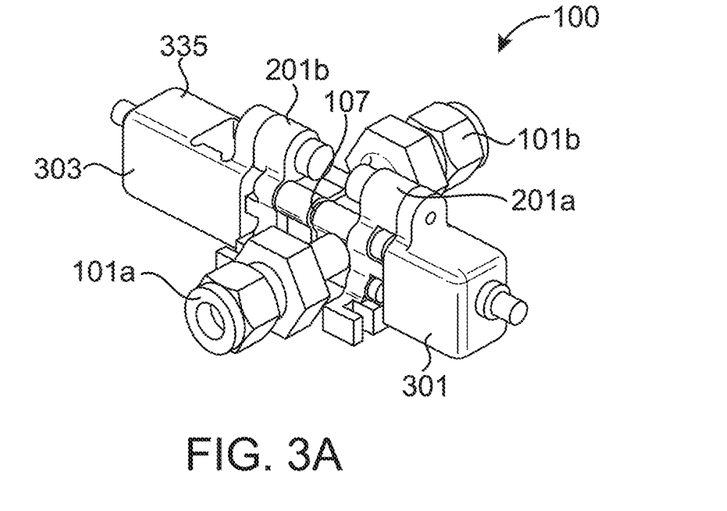
FIG. 3A shows the embodiment of FIG. 1 without a standard in place.
Figure 3B:
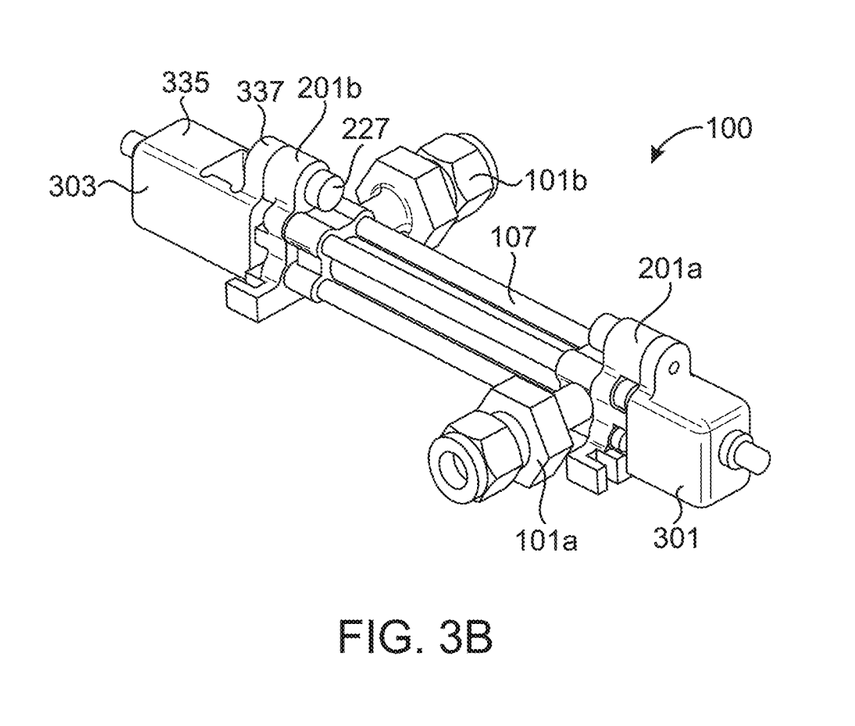
FIG. 3B shows the embodiment of FIG. 3A with a spacer added to increase the optical path length.

As can be seen in FIGS. 3A and 3B, hollow spacers (107) may be provided at a variety of different lengths. This allows for increased flexibility of the flow cell (100) as it can be easily built to have virtually any path length of light penetration desired by an end user. In the depicted embodiment of FIG. 3A, the path length may be measured in single centimeters or even millimeters, while in FIG. 3B much longer path lengths can be obtained. In additional embodiments much longer path lengths can be provided including virtually any desired length up to or even over a meter. In the depicted embodiment, the shape and size of the "top hat" window (203) provides that the length of the hollow spacer (107) is generally the path length of light penetration through the sample. FIGS. 8 and 9 illustrate how two different path length cells such as those shown in FIGS. 3A and 3B may be coupled together using the linking coupler of FIG. 7.

While FIGS. 1 and 2 shows the couplers (101a) and (101b) arranged at an essentially 180 degree difference in orientation from each other, it should be recognized that this is not required. Such as arrangement can be desirable for certain forms of torpidity measurement in the process stream, but the couplers (101) are typically designed to be modular and thus can be attached at essentially multiple different positions. Further, it should be noted that if desired, one, two or more couplers (101) may be included to form the common volume (175).

To seal the volumes (113), (115a), (115b) and (117) into the process stream and inhibit outside contamination, two ends (201a) and (201b) are provided. The ends (201a) and (201b) are designed to house a light window (203) which is sealed into opposing ends of the resultant internal volume (115a) or (115b) to provide the volume with a closed end. The window (203) is generally in the shape of a "top hat" with an extended structure and opposing connecting flange where the extended structure extends into volume (115a) or (115b) so as to typically allow fluid flow around it and into volume (117). The end of this extended structure then serves to send light into the volume (117). The window (203) may serve as a lens in certain embodiments. The positioning and arraignment of the windows (203) in the common volume (175) is most clearly seen in FIG. 5.

The light windows (203) are generally connected via a shim (205) to the end (201a) or (201b). The couplers (101a) and (101b) and the ends (201a) and (201b) may be held together by through-screws or bolts (209) which serve to compress the two couplers (101a) and (101b) between the two ends (201a) and (201b). It should be recognized that the ends (201a) and (201b) may be mirror images to each other or identical and arranged at opposing directions for modularity.

The combination of the couplers (101a) and (101b), spacer (107), and ends (201a) and (201b) effectively forms the flow cell (100). The flow cell (100) is then attached to the sensor (300). The sensor (300) comprises two separate components which are effectively an input (301) and a detector (303). The input (301) will be connected to a light pipe or similar source of light via the connector (311) while the detector (303) will commonly include an output connector (331) which may serve to direct the light back to a computer, processor, or other system which can interpret the results. The sensor (300) may be used to perform any type of light based measurement on the process stream including, without limitation, fluorescence or light absorption measurements.

Figure 4A:
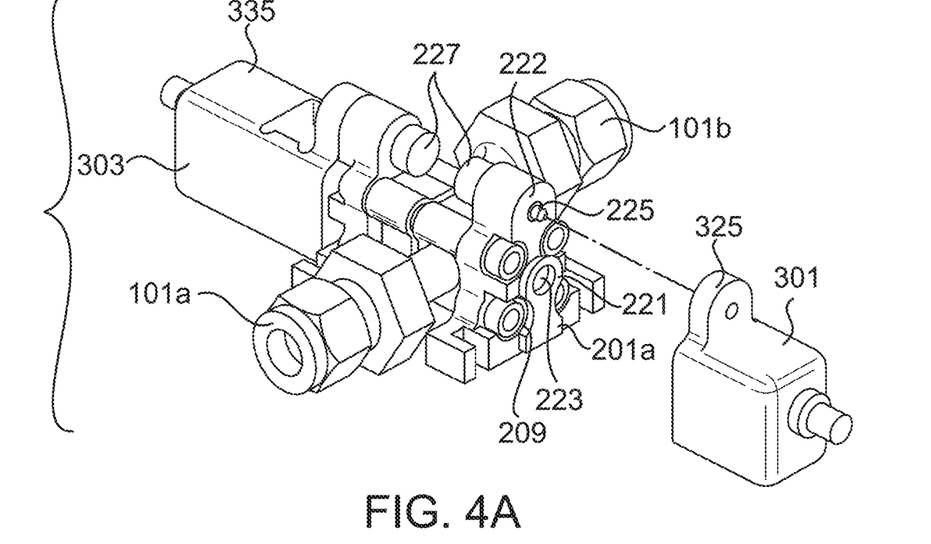
FIG. 4A shows the embodiment of FIG. 1 with one of the optical couplers disconnected.
Figure 4B:
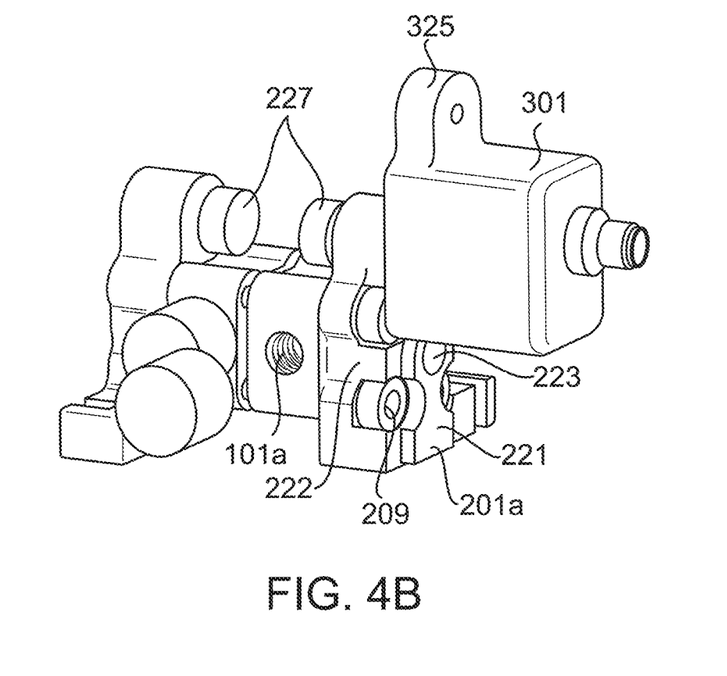
FIG. 4B shows the embodiment of FIG. 4A with the optical coupler partially reconnected.
Figure 5:
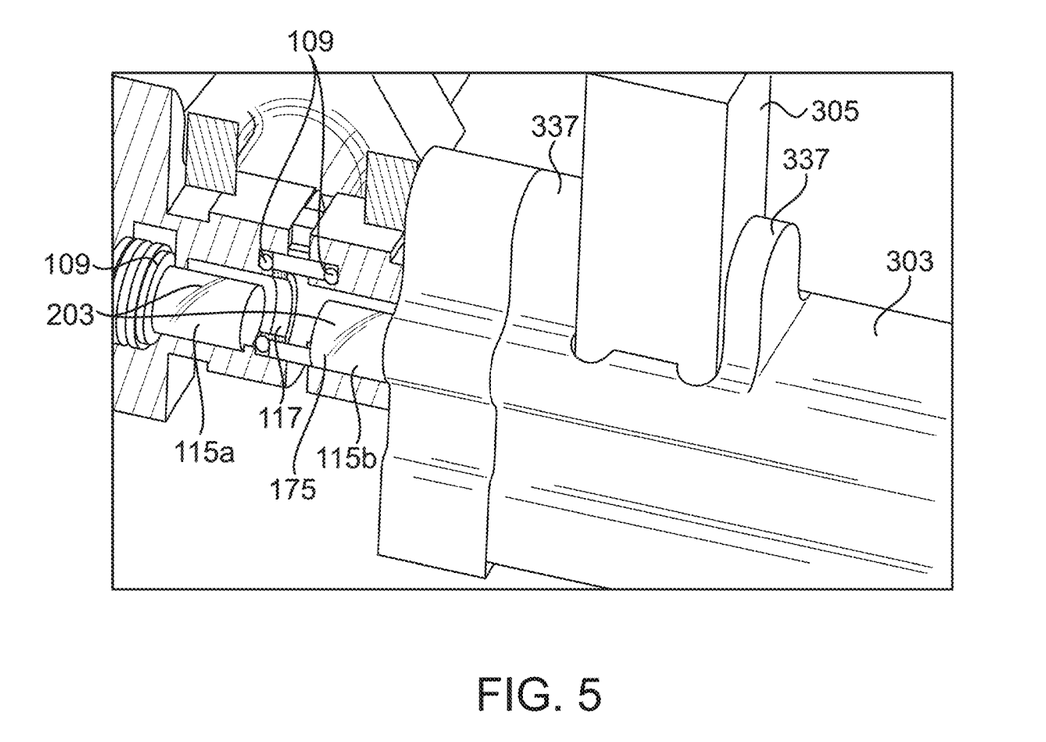
FIG. 5 shows the embodiment of FIG. 1 with the center cutaway to show interior structure.

Attachment of the input (301) and detector (303) portions of the sensor (300) to the flow cell (100) are typically performed as shown in the progression from FIG. 4A to FIG. 4B. In FIG. 4B, the input (301) is shown separated (and above) the end (201a). The end (201a) includes a shaped flange (221) which includes an access orifice (223) to the window (203). The input (301) is attached by placing a corresponding flange (not visible) over the flange (221) which serves to inhibit motion of the input portion (301) relative to the end (201a). To secure the input portion (301) to the end (201a), the end (201a) may also include a mounting screw or pin (225) and knob (227). The knob (227) can be used to move the pin (225) (either through rotational motion, spring biasing, or any other method) from a retracted position where it does not extend beyond the flange (221) side of the end (201a) to an extended position where it does.

The input (301) is typically secured by moving the pin (225) to the retracted position and maintaining it there while the corresponding flange on the input (301) is slid over the flange (221). Once the input portion (301) is correctly positioned, the pin (225) is placed in the extended position where it will extend into a corresponding mounting hole (325) in the input portion (301). The combination of the flange (221) and pin (225) along with other interacting components such as the outer wall (222) of the end (201a) and the heads or nuts of the bolts (209) will typically serve to securely hold the input portion (301) to the end (201a). A similar mechanism is also present in the end (201b) to attach to the detector portion (303). It should be recognized that in an embodiment, either of the input portion (301) and detector portion (303) can be interchangeably attached to either of the ends (201a) or (201b).

While the above form of connection is typically desired, it should be recognized that in an embodiment the flow cell (100) can work with multiple different types of sensors (300) and they may be attached or detached as desired. In an embodiment, the sensors (300) are designed to be replaced with different types of sensors (300) quickly and easily. Thus, the flanges (221) and the pin (225) may be designed to be sufficiently universal to work with a number of differently designed and manufactured sensor devices (including, without limitation, multiple types or brands of fiber optic spectrometers and photometers) or even with other sensors such as ultrasonic sensors or laser devices.

In the depicted embodiment, calibration is performed by providing a standard holder (305), which in this case corresponds to a standard 10mm square cuvette but that is by no means required. The holder (305) will have an additive standard placed therein and the holder (305), including the additive, standard will be inserted into a hole (335) which in this case is in the detector (303). Placement of the hole (335) for the holder (305) does not have to be in the detector (303) portion and may be in the input (301) portion in alternative embodiments. The hole (335) may be open as shown in the FIGS as light pollution is generally not an issue when a fiber optic light source is used. The hole (335) may also have associated guides (337) provided nearby but those are not required. The guides (337) can serve to improve the ease of orienting the holder (305) into the hole (335) and holding the holder (305) to keep it from tipping or otherwise moving when it is in the hole (335).

The holder (305) may be a variety of different objects. In the depicted embodiment, it comprises a standard cuvette into which a specific addition may be made which is to be added to the process stream during measurement. The addition will typically comprise only the material of interest (which may be suspended or otherwise placed in a support medium such as clean water) in a known concentration. This addition may be formulated for each test action and may be placed inside the cuvette holder (305) immediately prior to the holder (305) being inserted into the hole (335). The cuvette and/or holder (305) may also comprise a solid filter.

For example, the holder (305) may comprise a solid piece of colored glass. Alternatively, the addition may be made once and then sealed into the holder (305) to provide for an effectively permanent addition standard. The former can be desirable to allow for flexibility of material using a limited number of holders (305) with each addition only being used once or twice while the later may provide for a single very accurate sample creation to be made which can then be used an indefinite number of times. Further, while this disclosure generally contemplates that the addition may be in the form of a material suspended in a liquid as this more closely simulates the process stream for a liquid process stream, this is by no means required and the addition may be provided as a gas, as a material suspended in a solid, or in a solid form depending on what is desired for the addition, the natural of the process stream, and the type of sensor (300) being used.

In the depicted embodiment, the holder (305) includes two opposing windows (351) which allow light to penetrate through the holder (305) which is otherwise opaque. This can be desirable to insure proper orientation of the holder (305) in the hole (335) when it is in use. However, such a structure is by no means required and the entire holder (305) may be transparent or translucent to provide for proper light passage through the holder (305) and associated additive sample.

During operation, the flow cell (100) will be placed in a process stream or will have access to a portion of syphoned process stream which will be flowing through the volume (175). Light will be shown through the portion of the process stream within the volume (117) by going from the input portion (301) through the end (201a) and window (203), through the volume (117) through the opposing window (203) in end (201b) and into the detector portion (303). In standard sensing operation the hole (335) will either be empty or a "blank" will be placed therein. For example a holder (305) may be provided which comprises a transparent material having no material or interest or other material which will interact with the light in it. This may be, for example, a holder (305) including clean water or comprising solid glass, for example. It could also comprise a lens for focusing of light, if desired. Once beyond the hole (335) the light is recollected by the detector (303) and provided to the processor which will process the light signal and determine the desired characteristic being sensed by the sensor (300).

To calibrate the sensor (300), the sensor may be removed from the flow cell (100) by loosening the pins (225) and separating the input (301) and detector (303) portions of the sensor (300) from the flow cell (100). The sensor (300) may then be attached to a test rig as was previously known in the art. This may be desirable in some situations such as for calibration of the sensor (300) using absolute samples as opposed to standard addition.

Alternatively, the individual performing the testing may place a series of holders (305) into the hole (335) in a known pattern where the series includes the material of interest in various known concentrations in a carrier (if necessary) that does not influence the sensor (300) readings. In effect, the holder (335) is used to provide the "addition" from a standard addition calibration but instead of adding it to a test sample taken from the process stream, the addition is placed next to the process stream so that the light penetrates both the process stream and the addition sequentially. This is effectively "adding" the "addition" to the sample for the purposes of measurement, but avoids the need to actually mix the two elements physically together. The additions may comprise, in an embodiment, NIST traceable standards for photometric accuracy, wavelength accuracy, stray light, absorption standards (e.g. holmium oxide or didymium filters), absorbance stability, baseline stability, photometric repeatability or noise detection.

The testing individual may monitor the results of the sensor (300) as the various holders (305) having different amounts of addition are placed and then calibrate the sensor (300) by fitting a best fit curve to the readings. This can provide an indication of the amount of target material present currently in the process stream. A sample may be taken from the process stream in close temporal proximity to these readings being performed and its absolute value compared to the calibration. However, typically this will be unnecessary and the curve may be used to provide the current value of the material in the process stream via standard addition as is understand by a person having ordinary skill in the art.

It should be recognized that the test sample (the portion of the process stream which is present when the test with each holder (335) is performed) is not the "same" as it would be in a standard lab preparation of samples. However, even in the lab, portions of a single sample do not necessarily have to be identical. Further, so long as the calibration process is performed relatively quickly compared to the speed at which the process stream is expected to change, even though the process stream is continuing to flow during the calibration procedure the amount of material of interest should remain sufficiently constant for a best fit line to be selected without undue error being introduced.

Lack of concern for change in process streams during the testing procedure is particularly true where the flow cell is being used to detect large changes over time. For example, in the case where the flow cell (100) and sensor (300) is being used to detect when an upstream filter or similar apparatus has sufficiently failed to require replacement, the calibration process will generally comprise an extremely small amount of time compared to the expected life of the filter. Further, should this form of in situ testing happen to provide an anomalous reading, the sensor (300) may always be separated form the flow cell (100) as contemplated above and tested independently or can be immediately retested one or more additional times to validate results.

The embodiment of FIGS. 7-9 comprises a multi-pathlength flow cell (800) which effectively comprises the formation of two (or more) flow cells (100) which utilize a common process stream in multiple different tests which utilize different pathlengths. As discussed above in conjunction with FIGS. 3A and 3B, hollow spacers (107) may be provided between the couplers (101) to provide for different path lengths in different cells (100). In the embodiment of the multipath flow cell (800), a linking coupler (701), as shown in FIG. 7, is used to link multiple cells (100) together.

The linking coupler (701) is shown in detail in FIG. 7, however, it has been sectioned in FIG. 9 which can make some of its structure easier to see. The linking coupler (701) comprises a main body (705) which is formed to essentially be two of main body (105) arranged side by side with a small spacer section (751) between. The main body (705) while functionally two of main body (105) will typically be formed as a monolithic piece, but that is not required. The main body (705) thus includes two hollow internal volumes (715a) and (715b) arranged side-by-side and generally in parallel. The two internal volumes (715a) and (715b) are connected by a hollow tube (755) the opening to which is visible from hollow internal volume (715a) but which is most clearly shown in the section of FIG. 9. The hollow tube (755) passes through the spacer section (751) so that fluid can flow through it from hollow internal volume (715a) to (715b) or vice-versa.

The linking coupler (701) serves to interconnect two cells (100a) and (100b) by acting as two interconnected main bodies (105) without any connectors (103) being attached. Instead, the linking coupler (701) provides a pathway via tube (755) to interlink the other two stream couplers (101a) and (101b). This is best shown in FIG. 8.

As can be seen in FIG. 8, the cell (100a) resembles that of FIG. 3A, however, the stream coupler (101b) has been removed and replaced with the portion of the linking couple (701) including internal volume (715a). Thus, fluid flow into orifice (113a) of stream coupler (101a) will pass into the volume (115a) and then into internal volume (715a). This fluid flow (as the volume (715a) is closed at its end in the same manner as volume (115b) is in FIG. 2) is then directed into hollow tube (755) and from there into internal volume (715b).

As is also visible from FIG. 8, the portion of linking coupler (701) including volume (715b) is positioned in the cell (100b) which resembles the cell of FIG. 3B. However, in cell (100b) the location of stream coupler (101b) is in the location of stream coupler (101a) in FIG. 3B. Fluid flow from the volume (715b) is then directed backwards in the cell (100b) through the hollow spacer (107) and into the volume (115b). It is then directed out through orifice (113b) of stream coupler (101b). The entire fluid pathway (801) discussed above is indicated in FIG. 8 for clarity.

It should be apparent from the fluid pathway (801) that there two different measurements can be performed on the same process stream as it passes through the cell (800). Specifically, one is performed in cell (101a) and a second, which utilizes a longer pathway due to the presence of space (107), is performed in cell (101b). It should also be recognized that while in the embodiment of FIG. 8 the fluid makes a U-shaped bend first traveling left on the page and then right, this is by no means required. The position of the linking connector (701) and stream connector (101a) in the cell (100a) could be reversed which would result in the U-Shaped bend being two L-shaped bends where the fluid only flows to the right of FIG. 8. A similar substitute of linking connector (701) and stream connector (101b) in the cell (100b) would result in the two L-shaped bends creating a flow only to the left of FIG. 8. Finally, if both the above changes were made, the process stream would make a U-shaped bend 180 degrees different from that shown in FIG. 8.

As can be seen from FIG. 7-9, the ability to include the linking coupler (701) as part of a cell (800) allows for the interconnection of cells (100). Further, while FIGS. 8 and 9 show the interconnection of two cells (100), it should be apparent that any number of cells (100) can be connected together simply by using more linking connectors (701). For example, a second linking connector (701) could be used in place of stream connector (101b) in FIG. 8, this would allow a third cell to be placed thereon toward the top of the FIG. in the same manner as cell (100a) is placed on the bottom of the FIG. This new cell could then include a hollow volume (107) of different length to that in cell (100b) to provide a third pathlength of still different dimensions. This process could be repeated any number of times to provide any number of different pathlengths in a unified multi-path cell (800) as contemplated in FIGS. 8 and 9.

The various component cells (100a) and (100b) of the multi-pathlength cell (800) may each include a hole (335) and a corresponding holder (305) as discussed above in conjunction with the embodiments of FIGS. 1-5. This can allow each of the various cells (100a) and (100b) to be calibrated and/or tested in the same fashion as is discussed above in conjunction with FIGS. 1-5.

Figure 6:
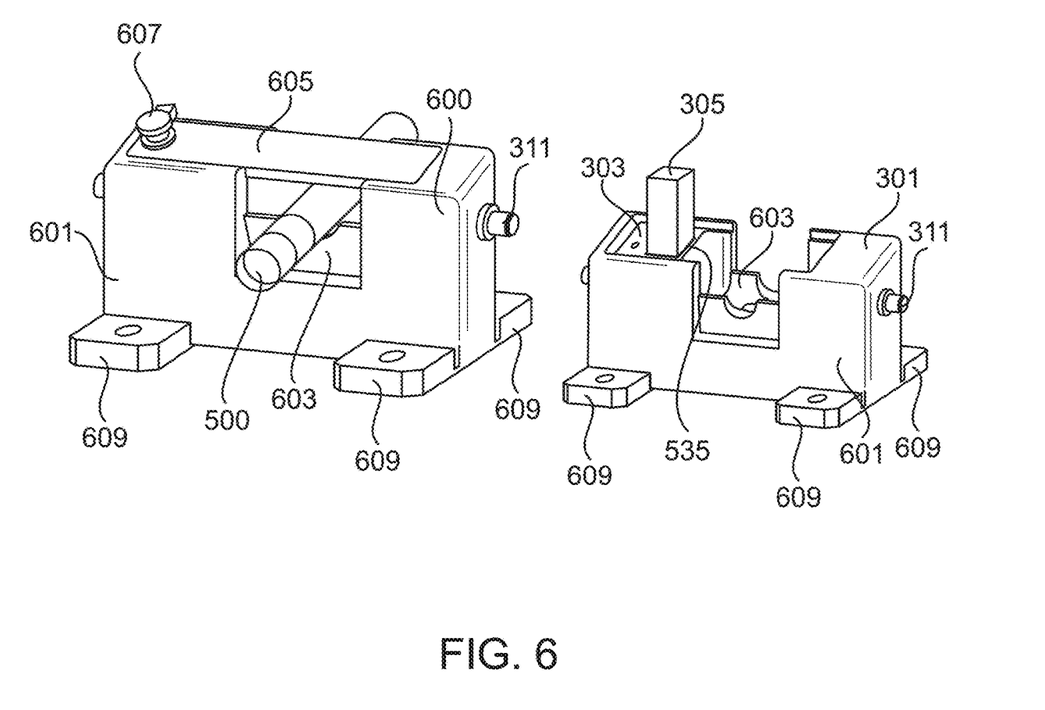
FIG. 6 shows an embodiment of a mounting which utilizes a disposable flow cell with similar optical coupling.

The embodiment of FIG. 6 is generally similar to the embodiment of FIGS. 1-5 in operation but is structurally different as the flow cell (500) is designed to be readily removable and is often only for single or limited time use. In this case, the flow cell (500) does not comprise the components of flow cell (100) but may comprise a small glass or plastic housing such as those flow cells produced by PendoTECH. This is placed in a housing (600) which serves to provide the mounting points of the sensor (300). In this case, the input portion (301) and detector portion (303) are both encased within the housing (600).

The housing (600) comprises a main body (601) which includes the two detector portions (301) and (303) as well as a cradle (603) between them. The cradle (603) is designed to support the flow cell (500) in the correct position to allow for light from the input portion (301) to penetrate it. To enable easy switching of the flow cell (500), the cell is not permanently connected to the housing (600) but is instead simply rested in the cradle (603) and the housing cover (605) is placed over it. The cover can then be screwed down using screw (607) to securely hold the flow cell (500) in place.

In the depicted embodiment, the hole (535), which corresponds to the hole (335), is placed in the detector portion (303) under the cover (607). This allows for the hole (535) to be sealed when the cover (607) is in place. This is by no means required and in an alternative embodiment the hole (535) may extend through the cover (607). As this embodiment is typically used with a disposable flow cell (500), during calibration the flow cell (500) may be present or simply removed as it is easily separated from the housing (600). This allows for calibration using standard addition by keeping the flow cell (500) in place in the same manner as above or may be used to calibrate the sensor (300) in the same manner as a test rig but by eliminating the test rig by removing the flow cell (500). For this reason, the input portion (301) and detector portion (303) of the sensor need not be separable from the housing (600) as there is no need to separate the sensor (300) from the housing (600) as the flow cell (500) may instead be removed. As in the previous embodiments, a holder (305) including the standard addition or other standard will typically be placed in hole (535) during calibration.

The housing (600) also includes a plurality of mounting feet (609) which are used to provide for a base of the housing (600). The feet may be used to provide stability when the housing (600) is placed on a surface or may include secondary mounting apparatus as shown in FIG. 6. In the embodiment of FIG. 6, the feet (609) each include a screw hole through which a screw may be placed to secure the housing (600) to a table, wall, shelf, or other object.

The qualifier "generally," and similar qualifiers as used in the present case, would be understood by one of ordinary skill in the art to accommodate recognizable attempts to conform a device to the qualified term, which may nevertheless fall short of doing so. This is because terms such as "spherical" are purely geometric constructs and no real-world component or relationship is truly "spherical" in the geometric sense. Variations from geometric and mathematical descriptions are unavoidable due to, among other things, manufacturing tolerances resulting in shape variations, defects and imperfections, non-uniform thermal expansion, and natural wear. Moreover, there exists for every object a level of magnification at which geometric and mathematical descriptors fail due to the nature of matter. One of ordinary skill would thus understand the term "generally" and relationships contemplated herein regardless of the inclusion of such qualifiers to include a range of variations from the literal geometric meaning of the term in view of these and other considerations.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, properties, or characteristics given for any single component of the present disclosure can be used interchangeably with any ranges, values, properties, or characteristics given for any of the other components of the disclosure, where compatible, to form an embodiment having defined values for each of the components, as given herein throughout. Further, ranges provided for a genus or a category can also be applied to species within the genus or members of the category unless otherwise noted.

The invention claimed is:

1. A flow cell comprising:
   a first stream coupler, said first stream coupler comprising a first main body having a first hollow internal volume therein and a first connector having a first orifice therein, wherein fluid flows from said first orifice into said first hollow internal volume and vice-versa;
   a second stream coupler, said second stream coupler comprising a second main body having a second hollow internal volume therein and a second connector having a second orifice therein, wherein fluid flows from said second orifice into said second hollow internal volume and vice-versa;
   a first seal positioned on an end of said first hollow internal volume and including a first light window capable of transmitting light into and out of said first hollow internal volume;
   a second seal positioned on an end of said second hollow internal volume and including a second light window capable of transmitting light into and out of said second hollow internal volume;
   a hollow spacer between said first hollow internal volume and said second hollow internal volume;
   an input, for directing light into said first hollow internal volume; and a detector, for detecting light exiting from said second hollow internal volume, said input and said detector together forming a sensor;
   wherein, said first stream coupler is arranged adjacent to said second stream coupler so such that fluid flows from said first orifice through said first hollow internal volume and through said hollow spacer, to said second hollow internal volume and to said second orifice; and
   wherein light passes from said input, through said first light window, through said first hollow internal volume and said hollow spacer, through said second hollow internal volume, and through said second light window before being detected by said detector.

2. The flow cell of claim 1 wherein a length of said hollow spacer is variably selected to define a desired path length of light penetration through the flow cell.

3. The flow cell of claim 1 further comprising a hole in said detector into which a holder may be placed.

4. The flow cell of claim 3 wherein said holder comprises a material standard.

5. The flow cell of claim 4 wherein said standard is a solid material.

6. The flow cell of claim 5 wherein said solid material comprises glass.

7. The flow cell of claim 3 wherein said holder comprises a cuvette.

8. The flow cell of claim 7 wherein said cuvette is filled with a liquid and said liquid comprises a material standard.

9. The flow cell of claim 8 wherein said cuvette is sealed.

10. The flow cell of claim 3 wherein said holder facilitates calibration of said sensor without removing said input or said detector from said flow cell.

11. The flow cell of claim 3 wherein said holder facilitates in situ testing of said sensor.

12. The flow cell of claim 3 wherein said holder positions a material standard next to a process stream flowing through said flow cell such that light may penetrate both the process stream and the material standard sequentially.

\* \* \* \* \*